UNITED STATES PATENT OFFICE.

WILLIAM H. ALTON, OF NEW YORK, N. Y., AND ALBERT C. BATTELLE, OF CHICAGO, ILLINOIS, ASSIGNORS, BY MESNE ASSIGNMENTS, TO ALBERT C. BATTELLE, OF CHICAGO, ILLINOIS.

FILLER.

1,350,694.      Specification of Letters Patent.      Patented Aug. 24, 1920.

No Drawing.      Application filed February 1, 1919. Serial No. 274,525.

*To all whom it may concern:*

Be it known that we, WILLIAM H. ALTON and ALBERT C. BATTELLE, citizens of the United States, residing at New York, county of New York, and State of New York, and at Chicago, county of Cook and State of Illinois, respectively, have invented certain new and useful Improvements in Fillers, of which the following is a specification.

The purpose of this invention is to provide a new and improved filler for paint, putty, rubber, dry colors, linoleum, paper, and fabrics, such as window shades, oil-cloth and the like, and for other purposes for which whiting is now commonly used. It consists in the combination of elements hereinafter described as indicated in the claims.

It is generally well understood that calcium carbonate chemically obtained as a precipitate, although as to chemical constituents it is the equivalent of natural whiting or dehydrated pulverized chalk, is not entirely satisfactory for the purposes for which natural whiting is employed, as, for example, as a filler for paint, and in the manufacture of putty, rubber, linoleum, dry colors, window shades, oil-cloth and the like; and though its use for some of these purposes has been attempted and it is being employed to some extent, it is a rather inferior substitute for natural whiting for these uses.

I have discovered, however, that the combination of chemically precipitated calcium carbonate with a substantial proportion of ground lime stone, or dolomite, or ground marble or calcite produces a mixture having many of the good qualities of natural whiting as a filler for the purposes mentioned, for which natural whiting has heretofore been considered the only satisfactory material. One great advantage of the resulting filler, in the case of commodities in which oil is used, is that the mixture acquires the proper consistency and mechanical texture by the addition of a much less quantity of oil than is required with the chemically precipitated calcium carbonate when used alone. I believe the improved character of the mixture may be due to the fact that the impalpable powder of which the chemically precipitated calcium carbonate consists, being very much finer of as low as ten per cent. of the ground than the ground lime-stone or ground marble with which I mix it, occupies the interstices of the coarser material, thereby requiring a smaller quantity of oil to completely amalgamate the mixture; and that this causes it, upon oxidation of the oil in the subsequent processes of use for the various articles of manufacture, as in the drying of the paint, or the like, of which the said mixture constitutes the body, to be more compact, less porous, better adapted to furnish a smooth or glazed surface; and for the same reasons it has both greater tenacity and greater flexibility in the completed product in which it is used, than can be obtained by the use of chemically precipitated calcium carbonate alone.

In the manufacture of rubber the improved quality of the final product is very marked when a combination of this precipitated calcium carbonate and a good natural carbonate is used as compared with the result of using the chemical product alone as a filler, though why this is so I cannot say with certainty. Possibly my theory as to the finer particles filling the spaces between the coarser ones, above stated with respect to oil-absorbing mixtures, may also account for the increased homogeneity of the rubber product which has been noted when the combination filler was used.

When this filler is employed in calcimine the "spread" is more even and brush marks show less, provided a judicious amount of ground limestone, marble, dolomite or calcite, is used with the chemical precipitate. Probably this is because the precipitated carbonate, being so finely divided, has a tendency to stick like paste, while the coarser natural particles apparently improve the flow.

The proportions in which the two elements, namely, the chemically precipitated calcium carbonate and the ground or pulverized limestone, dolomite or marble may be employed with the good results indicated, may be varied quite widely. I have employed the two substances mixed in equal quantities with good results, and even up to a proportion of three-fourths of the ground natural carbonate to one-fourth of the chemical precipitate; while, as compared with using the precipitated carbonate alone, a distinct improvement in the quality of the mixture is to be noted upon the addition earth product. And an addition of ten per cent. of the precipitated calcium carbonate to ground limestone, dolomite or marble, produces a mixture which can be used very satisfactorily for some of the purposes mentioned.

We claim:—

1. A filler consisting of a mechanical mixture of chemically precipitated calcium carbonate with finely ground natural carbonate.

2. A filler consisting of a mechanical mixture of chemically precipitated calcium carbonate with finely ground natural calcium carbonate.

In testimony whereof, we have hereunto set our hands respectively at New York, N. Y., this 27 day of January, A. D. 1919. and at Chicago, Illinois, this 30th day of January A. D. 1919.

WILLIAM H. ALTON.
ALBERT C. BATTELLE.

It is hereby certified that in Letters Patent No. 1,350,694, granted August 24, 1920, upon the application of William H. Alton, of New York, N. Y., and Albert C. Battelle, of Chicago, Illinois, for an improvement in "Fillers," an error appears in the printed specification requiring correction as follows: Page 1, strike out line 55; page 2, insert as line 1, the words *of as low as ten per cent. of the ground* ;and that the said Letters Patent should be read with this correction therein that the same may conform to the record of the case in the Patent Office.

Signed and sealed this 5th day of October, A. D., 1920.

[SEAL.]

M. H. COULSTON,

*Acting Commissioner of Patents.*

Cl. 134—58.